(12) United States Patent
Taniguchi et al.

(10) Patent No.: US 11,498,171 B2
(45) Date of Patent: Nov. 15, 2022

(54) AUTOMATIC TOOL EXCHANGE COUPLER AND AUTOMATIC TOOL EXCHANGE APPARATUS

(71) Applicant: NITTA CORPORATION, Osaka (JP)

(72) Inventors: Yosuke Taniguchi, Nabari (JP); Kenji Tsurimoto, Nabari (JP)

(73) Assignee: NITTA CORPORATION, Osaka (JP)

( * ) Notice: Subject to any disclaimer, the term of this patent is extended or adjusted under 35 U.S.C. 154(b) by 316 days.

(21) Appl. No.: 16/652,364

(22) PCT Filed: Oct. 19, 2018

(86) PCT No.: PCT/JP2018/039014
§ 371 (c)(1),
(2) Date: Mar. 30, 2020

(87) PCT Pub. No.: WO2019/087821
PCT Pub. Date: May 9, 2019

(65) Prior Publication Data
US 2020/0269370 A1 Aug. 27, 2020

(30) Foreign Application Priority Data
Oct. 30, 2017 (JP) .............................. JP2017-209591

(51) Int. Cl.
*B25J 15/00* (2006.01)
*B23Q 3/155* (2006.01)
(Continued)

(52) U.S. Cl.
CPC ........ *B23Q 3/1554* (2013.01); *B25J 15/0425* (2013.01); *B25J 19/0033* (2013.01);
(Continued)

(58) Field of Classification Search
CPC ...... B23Q 3/1554; B23Q 2003/155428; B23Q 2003/155418; B25J 15/0408;
(Continued)

(56) References Cited

U.S. PATENT DOCUMENTS 4,611,377 A   9/1986 McCormick et al.
4,636,135 A * 1/1987 Bancon ................ B25J 15/0491
                                                483/901
(Continued)

FOREIGN PATENT DOCUMENTS

JP   S60-213494    10/1985
JP   H04-083588 U   7/1992
(Continued)

OTHER PUBLICATIONS

International Search Report dated Dec. 4, 2018 in International Application No. PCT/JP2018/039014.

*Primary Examiner* — Paul T Chin
(74) *Attorney, Agent, or Firm* — Wentsler LLC

(57) ABSTRACT

An automatic tool exchange coupler and an automatic tool exchange device are provided that achieve further improvement in the user-friendliness of the automatic tool exchange device. The coupler includes a coupler body, a first direction switching valve and a second direction switching valve that are provided to a first side surface of the coupler body. The coupler body has: in a first side surface, an uncoupling input port being connected to a pipe for introducing a gas for uncoupling; and in the second side surface opposite to the first side surface, an uncoupling output port being configured to connected to the uncoupling port. The uncoupling input port is located at a position where a center of the uncoupling input port is radially offset with respect to the uncoupling output port by at least an amount corresponding to a length of a diameter of the uncoupling input port.

4 Claims, 10 Drawing Sheets

(51) Int. Cl.
*B25J 19/00* (2006.01)
*B25J 15/04* (2006.01)

(52) U.S. Cl.
CPC ............ *B23Q 2003/155418* (2016.11); *B23Q 2003/155428* (2016.11); *B25J 15/0408* (2013.01)

(58) Field of Classification Search
CPC ................ B25J 15/0425; B25J 15/0019; B25J 15/0025; B25J 15/028; B25J 15/009
USPC .......................................................... 294/213
See application file for complete search history.

(56) References Cited

U.S. PATENT DOCUMENTS

| | | | |
|---|---|---|---|
| 4,664,588 A | 5/1987 | Newell et al. | |
| 4,676,142 A | 6/1987 | McCormick et al. | |
| 4,784,421 A * | 11/1988 | Alvité | B25J 19/063 294/119.1 |
| 4,809,747 A * | 3/1989 | Choly | F16L 37/23 901/41 |
| 4,917,619 A * | 4/1990 | Nishiwaki | B23K 9/323 901/50 |
| 4,990,022 A * | 2/1991 | Watanabe | B25J 15/04 403/322.3 |
| 5,243,264 A * | 9/1993 | Takada | B25J 15/04 403/328 |
| 6,402,443 B1 | 6/2002 | Hoppe | |
| 6,484,612 B1 * | 11/2002 | Miyachi | B25J 15/04 82/158 |
| 9,151,343 B2 * | 10/2015 | Norton | F16D 41/086 |
| 10,259,127 B2 * | 4/2019 | Bellandi | B25J 19/0033 |
| 10,780,575 B2 * | 9/2020 | Reese | B25J 19/0029 |
| 2016/0059424 A1 | 3/2016 | Zachary et al. | |
| 2016/0089794 A1* | 3/2016 | Niu | F16L 3/015 901/27 |
| 2017/0239823 A1 | 8/2017 | Bellandi | |

FOREIGN PATENT DOCUMENTS

| | | |
|---|---|---|
| JP | H05-301186 | 11/1993 |
| JP | H08-025265 | 1/1996 |
| JP | 2001-96437 | 4/2001 |
| JP | 2003-117868 | 4/2003 |
| JP | 3564565 | 6/2004 |
| JP | 2012-250327 | 12/2012 |
| JP | 2017-164894 | 9/2017 |

\* cited by examiner

US 11,498,171 B2

AUTOMATIC TOOL EXCHANGE COUPLER AND AUTOMATIC TOOL EXCHANGE APPARATUS

TECHNICAL FIELD

The present invention relates to an automatic tool exchange coupler and an automatic tool exchange device.

BACKGROUND ART

A disclosed tool exchange apparatus usable for a variety of apparatuses, such as an industrial robot, includes a first coupling member that is to be attached to a robot side and a second coupling member that is to be attached to a tool side (e.g., Patent Literature 1). The first coupling member includes a first coupling body provided with a protruding portion and a cam that is to radially project from the protruding portion. A second coupling member includes a second coupling body provided with a coupling hole that is to receive the protruding portion therein and the coupling hole has an inner peripheral surface provided with an engagement part engageable with the cam. The first coupling member and the second coupling member of the tool exchange device are coupled by engaging the cam with the engagement part with the protruding portion being received in the coupling hole. Meanwhile, the first coupling member and the second coupling member are uncoupled from each other by disengaging the cam from the engagement part. The tool exchange device thus enables the exchange of a tool being attached to the industrial robot.

For a tool exchange device as described above, a mechanism is disclosed that is intended for preventing the coupled first coupling member and second coupling member from being uncoupled by an erroneous operation (for instance, Patent Literature 2). Patent Literature 2 discloses an automatic tool exchange coupler that includes a first direction switching valve that mechanically switches in accordance with whether the first coupling member is coupled to the second coupling member and a second direction switching valve that mechanically switches in accordance with whether the first coupling member is coupled to the second coupling member placed on a mount. The coupler allows a gas flow path to lead to an uncoupling port via the first and second direction switching valves only when the first coupling member and the second coupling member are uncoupled from each other, or coupled to each other while the second coupling member is placed on the mount.

CITATION LIST

Patent Literature

Patent Literature 1: Japanese Patent Laid-Open No. 2012-250327
Patent Literature 2: Japanese Patent No. 3564565

SUMMARY OF INVENTION

Technical Problem

In the instance of Patent Literature 2, the coupler is located at a positions different from an uncoupling port and a coupling port of the first coupling member, and a gas for uncoupling supplied from the robot side is supplied to the uncoupling port through the automatic tool exchange coupler and a tube. Thus, the tube is arranged around the automatic tool exchange device, so that the tube is likely to interfere with the external environment as the robot is turned. In addition, such a surrounding tube, which is an uncertainty, makes off-line teaching difficult. The typical automatic tool exchange coupler thus limits a function of the automatic tool exchange device.

An object of the present invention is to provide an automatic tool exchange coupler and an automatic tool exchange device that achieve further improvement in the user-friendliness of the automatic tool exchange device.

Solution to Problem

According to the present invention, an automatic tool exchange coupler used for an automatic tool exchange device, the automatic tool exchange device including a first coupling member being removably attached to a body of an apparatus and a second coupling member being removably attached to a tool, the first coupling member including a cylinder chamber and having a coupling port and an uncoupling port that are connected to the cylinder chamber and arranged in parallel with an axial direction of the cylinder chamber, the second coupling member being coupled to or uncoupled from the first coupling member by moving a cam provided to the first coupling member with a gas supplied to the coupling port or the uncoupling port, the coupler includes: a coupler body; and a first direction switching valve and a second direction switching valve that are provided to a first side surface of the coupler body, the first direction switching valve switchable depending on whether the first coupling member is coupled to the second coupling member, the second direction switching valve switchable depending on whether the first coupling member is coupled to the second coupling member placed on a mount, in which the coupler body has: a plurality of ports and a plurality of paths that communicating the plurality of ports; in the first side surface, a coupling input port being connected to a pipe for introducing a gas for coupling and an uncoupling input port being connected to a pipe for introducing a gas for uncoupling; and in a second side surface opposite to the first side surface, a coupling output port being configured to connected to the coupling port and an uncoupling output port being configured to connected to the uncoupling port, the coupling input port and the coupling output port are coaxially arranged, the uncoupling output port is arranged in parallel with the coupling output port in the axial direction of the cylinder chamber, and the uncoupling input port is located at a position where a center of the uncoupling input port is radially offset with respect to the uncoupling output port by at least an amount corresponding to a length of a diameter of the uncoupling input port.

According to the present invention, an automatic tool exchange device includes: the first coupling member provided with the automatic tool exchange coupler; and the second coupling member provided with a dog, the dog being at a position corresponding to the first direction switching valve.

Advantageous Effects of Invention

According to the present invention, the coupler has the plurality of paths for communicating the plurality of ports and the uncoupling input port is located at the position where the center thereof is radially offset with respect to the uncoupling output port by at least an amount corresponding to a length of a diameter of the uncoupling input port. This allows a pipe from an apparatus body to be directly connected to the uncoupling port and the coupling port. Thus, the automatic tool exchange device eliminates the necessity of a pipe for communicating the uncoupling port and the coupling port with a further improved user-friendliness.

BRIEF DESCRIPTION OF DRAWINGS

FIG. 2 is a cross sectional view taken along A-A in FIG. 1 showing an uncoupled state of the tool exchange device according to the present embodiment, in which

DESCRIPTION OF EMBODIMENTS

An embodiment of the present invention will be described below in detail with reference to drawings.

1. Overall Configuration (Automatic Tool Exchange Device)

Figure 1:
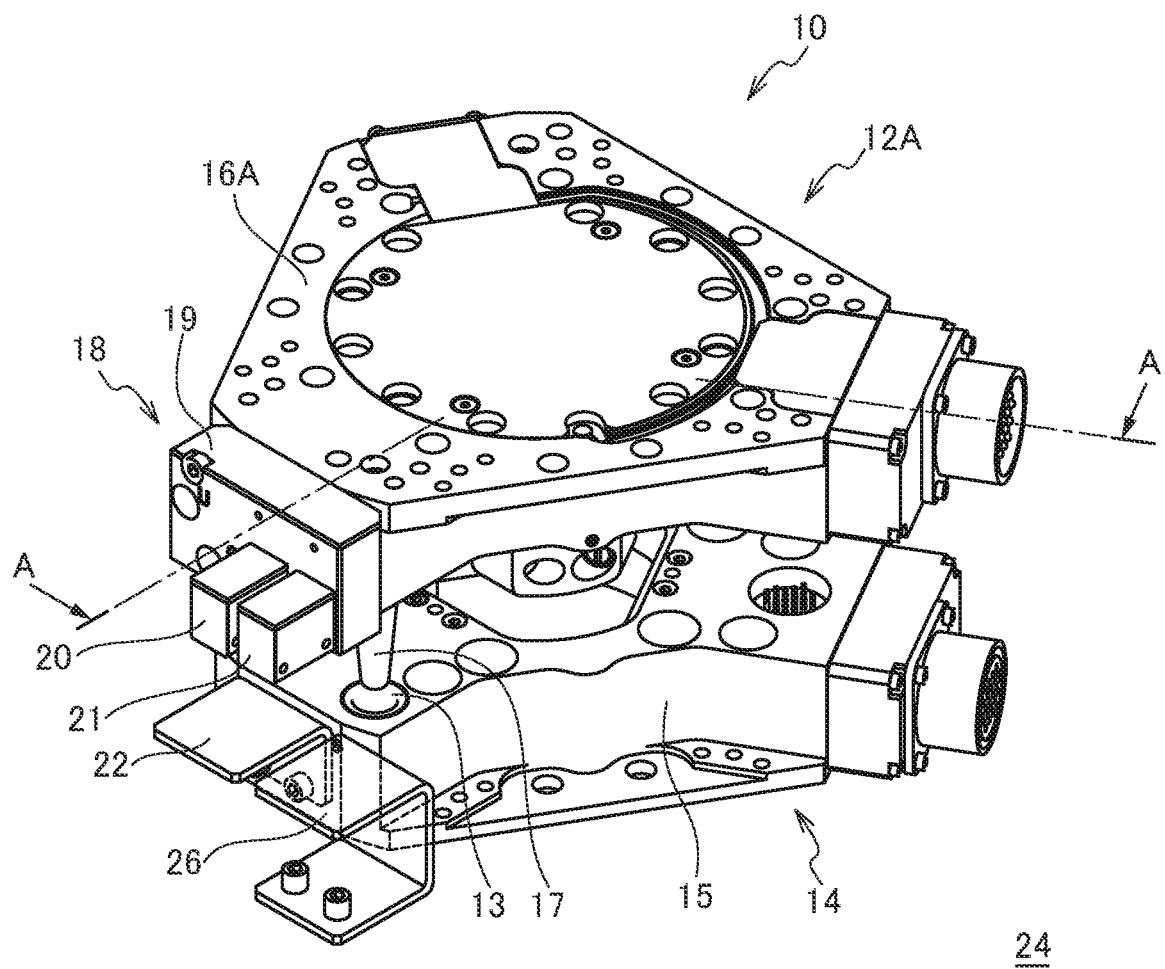
FIG. 1 is a perspective view showing a tool exchange device according to the present embodiment.

An automatic tool exchange device 10 shown in FIG. 1 includes a first coupling member 12A being fixed to a distal end of an apparatus body or industrial robot arm (not shown) and a second coupling member 14 being fixed to a tool (not shown). The second coupling member 14 shown in the figure is placed on a mount 24 when not coupled to the first coupling member 12A. The first coupling member 12A is accurately positioned with respect to the second coupling member 14 by inserting a positioning pin 17 provided to a first coupling body 16A in a positioning hole 13 formed in a second coupling body 15 of the second coupling member 14. The tool is not limited but may be, for instance, a spot-welding gun or a robot hand. The first coupling member 12A and the second coupling member 14 are removably fastened to the robot arm and the tool with a fastener such as a bolt (not shown), respectively. The robot arm and the tool are coupled to and uncoupled from each other via the automatic tool exchange device 10.

The first coupling member 12A is provided with an automatic tool exchange coupler (hereinafter, referred to as "coupler") 18. The coupler 18 includes a first direction switching valve 20 and a second direction switching valve 21. The second coupling member 14 is provided with a first dog 22 at a position corresponding to the first direction switching valve 20. The mount 24 is provided with a second dog 26 at a position corresponding to the second direction switching valve 21.

Figures 2A, 2B:
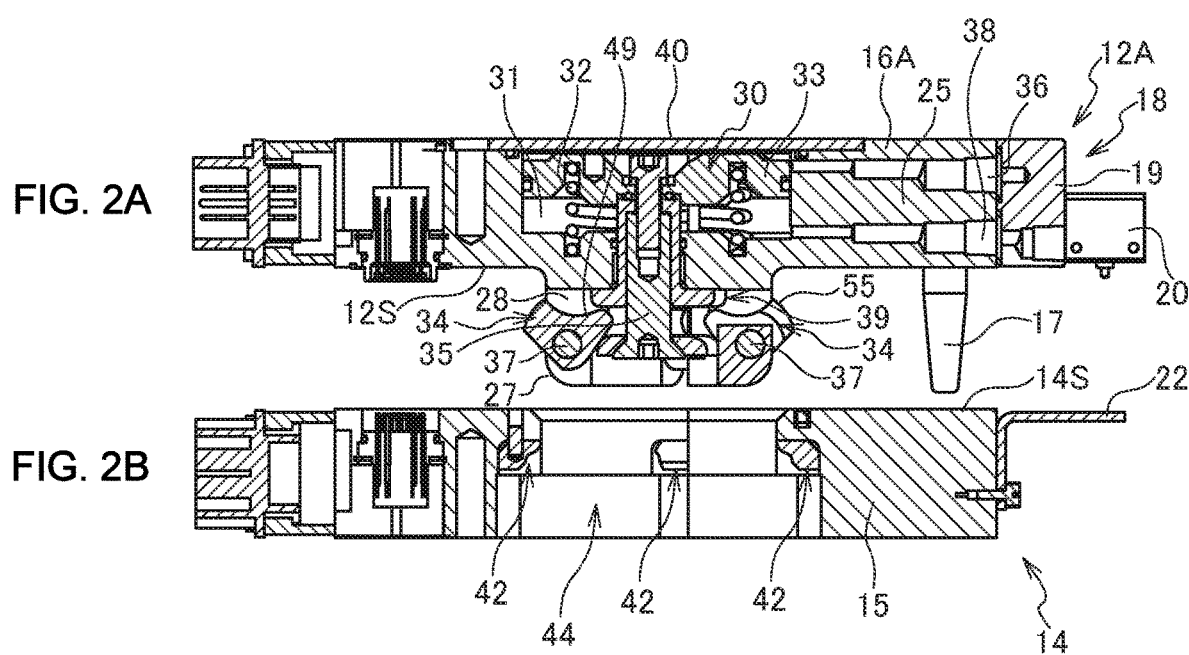
FIG. 2A shows a first coupling member and FIG. 2B shows a second coupling member.

As shown in FIG. 2A, the first coupling member 12A includes the first coupling body 16A and components provided to the first coupling body 16A, i.e., a cylinder 30, a coil spring 32, and a cam 34. The coil spring 32 is installed to press the cylinder 30 upward in a single direction. The cylinder 30 linearly moves in a single direction and the other direction (hereinafter, referred to as axial direction) to cause the cam 34 to rotate.

The first coupling body 16A includes a plate-shaped portion 25 formed substantially in the shape of a plate, a protruding portion 27 protruding from a surface of the plate-shaped portion 25, and a cylinder chamber 31 defined inside the plate-shaped portion 25, and a cam mechanism housing chamber 28 defined inside the protruding portion 27 coaxially with the cylinder chamber 31. The cylinder chamber 31 is defined by closing a hole formed in the other surface of the plate-shaped portion 25 with a cover 40. An uncoupling port 36 and a coupling port 38 are connected to the cylinder chamber 31 side by side in the axial direction. In the surface of the plate-shaped portion 25, a first contact surface 12S is defined at a periphery of the protruding portion 27.

The cylinder 30 includes a piston 33 located inside the cylinder chamber 31, a piston rod 35 provided on a center shaft of the piston 33, and an operating unit 39 formed near a distal end of the piston rod 35. The piston 33 is configured to be slidable in the axial direction inside the cylinder chamber 31. The uncoupling port 36 and the coupling port 38 are connected to one side and the other side of the cylinder chamber 31 in the axial direction across the piston 33, respectively. The piston rod 35 has a base end connected to the piston 33 and a distal end located in the cam mechanism housing chamber 28. The distal end of the piston rod 35 is provided with the operating unit 39. The operating unit 39 is substantially in the shape of a disc as radially extended from the piston rod 35 and defines a space in the axial direction.

The cam 34, which is an inverted L-shaped member, is rotatably supported substantially at a center by the protruding portion 27 of the first coupling body 16A via the support shaft 37, and includes a receiving portion 49 at one end thereof and an operating portion 55 at the other end thereof. The receiving portion 49 has a recessed (curved) surface at one side thereof across the one end of the cam 34 and a flattened surface at the other side thereof. The operating portion 55 is formed in an arc shape. The receiving portion 49 is received in the space defined by the operating unit 39 with the recessed surface being in contact with an upper side of the space and the flattened surface being in contact with a lower side of the space. A linear motion of the piston rod 35 causes the operating unit 39 to press the recessed surface downward while pressing the flattened surface upward, thereby causing the cam 34 to rotate around the support shaft 37. A plurality of, in the present embodiment, three, cams 34 are evenly arranged on a circumference of the protruding portion 27.

As shown in FIG. 2B, the second coupling member 14 includes the second coupling body 15 and an engagement part 42 fixed to the second coupling body 15. The second coupling body 15, which is formed substantially in the shape of a plate, has a coupling hole 44 that is open in a thickness direction. In the coupling hole 44, the engagement part 42 is located at a circumferential position corresponding to the cam 34.

Figure 3:
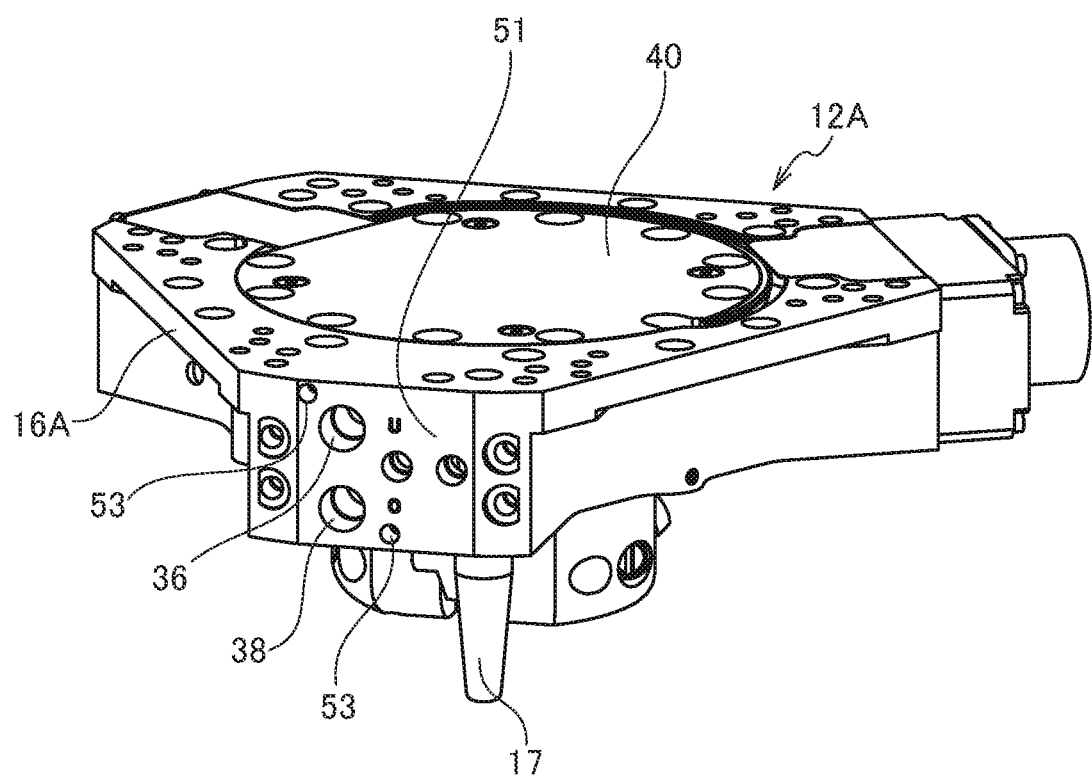
FIG. 3 is a perspective view showing the first coupling member according to the present embodiment.

As shown in FIG. 3, the first coupling body 16A has an outer peripheral surface provided with an attachment portion 51 for attaching the coupler 18. The attachment portion 51 is provided with the uncoupling port 36, the coupling port 38, and a threaded hole 53. The uncoupling port 36 and the coupling port 38 are arranged in parallel with each other in the axial direction of the cylinder 30. In the figure, the uncoupling port 36 is located at an upper side and the coupling port 38 is located at a lower side.

(Coupler)

Figure 4:
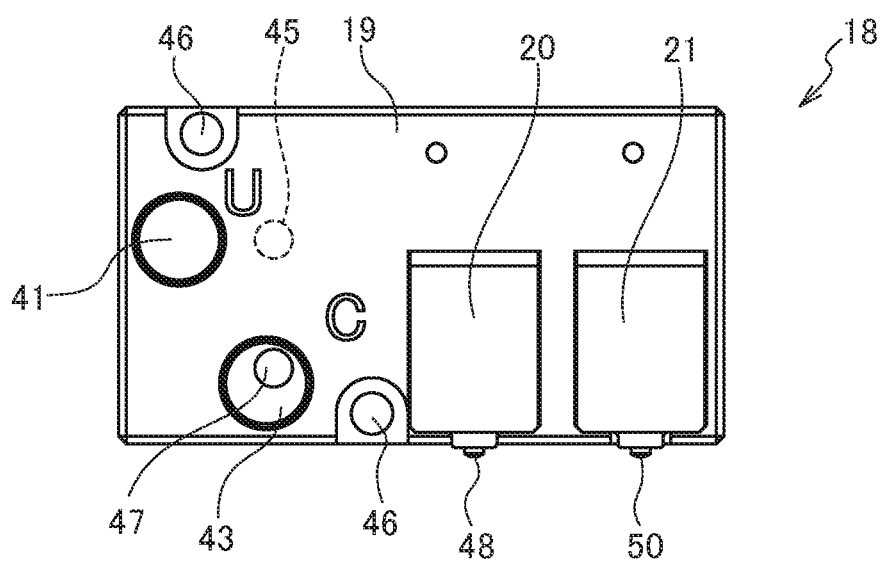
FIG. 4 is a front view showing an automatic tool exchange coupler according to the present embodiment.

As shown in FIG. 4, the coupler 18 includes a coupler body 19. The first direction switching valve 20 and the second direction switching valve 21 are provided at a first side surface of the coupler body 19. The coupler body 19 is provided with an uncoupling input port 41 and a coupling input port 43 at the first side surface thereof and an uncoupling output port 45 and a coupling output port 47 at a second side surface thereof, while having therein a plurality of paths (not shown in the figure) that communicate these ports.

The uncoupling input port 41 and the coupling input port 43 are connected to a pipe through a connector (not shown). The pipe is connected to a compressor via a solenoid valve. The solenoid valve switches between supply of a gas for uncoupling to the uncoupling input port 41 or a gas for coupling to the coupling input port 43 and discharge thereof from the uncoupling input port 41 or the coupling input port 43. It is preferable that a center-to-center distance between the uncoupling input port 41 and the coupling input port 43 is equal to or more than a center-to-center distance between the uncoupling port 36 and the coupling port 38. An extremely close center-to-center distance between the uncoupling input port 41 and the coupling input port 43 makes an operation for connecting the pipe to the uncoupling input port 41 and the coupling input port 43 difficult. It is more preferable that the center-to-center distance between the uncoupling input port 41 and the coupling input port 43 is substantially the same as the center-to-center distance between the uncoupling port 36 and the coupling port 38. In this case, the pipe can be connected to the uncoupling input port 41 and the coupling input port 43 in the same process as for directly connecting the pipe to the uncoupling port 36 and the coupling port 38 without using the coupler 18, allowing the operation to be performed without unnaturalness. The expression "substantially the same" is not limited to an instance of being completely the same, but includes an instance of being different slightly enough for an operator to connect the pipe to the uncoupling port 36 and the coupling port 38 without unnaturalness as compared with an instance of directly connecting the pipe to the uncoupling port 36 and the coupling port 38 without using the coupler 18.

The uncoupling output port 45 and the coupling output port 47 are located at positions corresponding to the uncoupling port 36 and the coupling port 38 of the attachment portion 51, respectively. The coupling input port 43 and the coupling output port 47 are substantially coaxially arranged. The expression "substantially coaxial" is not limited to an instance of being completely coaxial, but includes an instance where respective center axes of the coupling input port 43 and the coupling output port 47 are offset from each other by an amount corresponding to a length of a radius of the coupling input port 43.

The uncoupling output port 45 is substantially in parallel with the coupling output port 47 in an axial direction of the cylinder chamber 31. The uncoupling input port 41 is located at a position where the center thereof is radially offset with respect to the uncoupling output port 45 by at least an amount corresponding to a length of the diameter of the uncoupling input port. In an instance shown in the figure, the uncoupling input port 41 is located at a position offset leftward with respect to the uncoupling output port 45.

The coupler body 19, which is a plate-shaped member of a horizontally elongated rectangle, is provided with the uncoupling input port 41 and the coupling input port 43 at one longitudinal side thereof (in the figure, left side) and the first direction switching valve 20 and the second direction switching valve 21 at the other longitudinal side thereof (in the figure, right side). The coupler body 19 has a lower end located at the same level as the first contact surface 12S of the first coupling body 16A. The uncoupling input port 41 is located at a position offset with respect to the uncoupling output port 45 in a direction away from the first direction switching valve 20 and the second direction switching valve 21 (in the figure, leftward).

Each of the first direction switching valve 20 and the second direction switching valve 21, which is in the form of a valve with three ports, may be either a mechanical or electromagnetic valve. In the present embodiment, each of the first direction switching valve 20 and the second direction switching valve 21 is a mechanical valve. The first direction switching valve 20 includes a first valve 48 and the second direction switching valve 21 includes a second valve 50. The first direction switching valve 20 and the second direction switching valve 21 are located with the first valve 48 and the second valve 50 projecting downward from the lower end of the coupler body 19, respectively.

Figure 8:
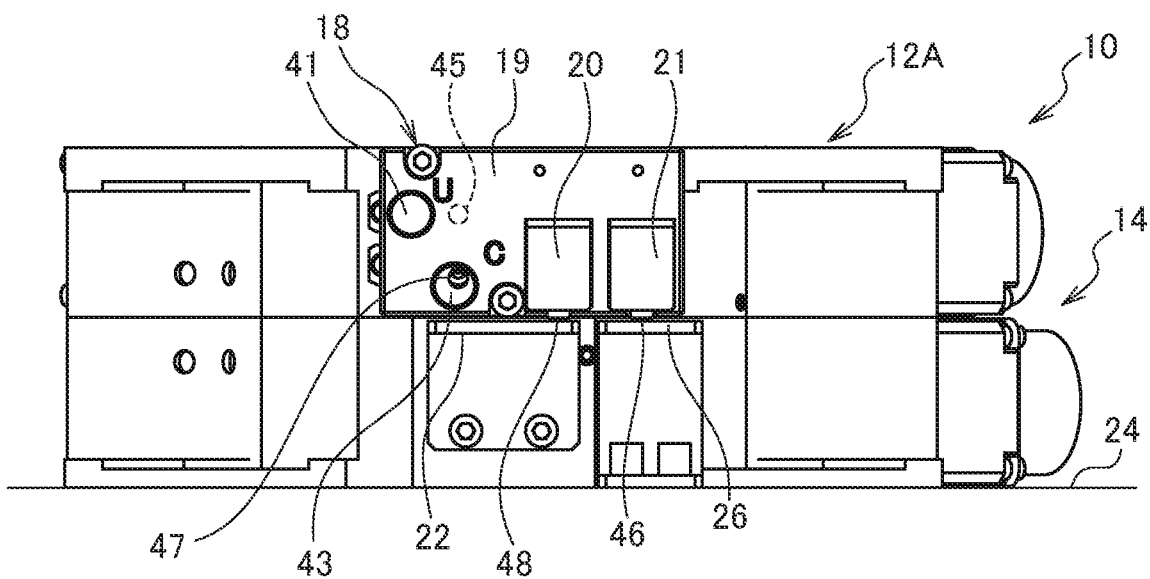
FIG. 8 is a front view showing the coupled state of the tool exchange device according to the present embodiment.

The first direction switching valve 20 switches an output of the first direction switching valve 20 in accordance with whether the first coupling member 12A and the second coupling member 14 are coupled. The first direction switching valve 20 detects whether the first coupling member 12A and the second coupling member 14 are coupled in accordance with whether the first valve 48 is brought into contact with the first dog 22 (FIG. 8).

The second direction switching valve 21 switches an output of the second direction switching valve 21 in accordance with whether the first coupling member 12A is coupled to the second coupling member 14 placed on the mount 24. The second direction switching valve 21 detects whether the first coupling member 12A is coupled to the second coupling member 14 placed on the mount 24 in accordance with whether the second valve 50 is brought into contact with the second dog 26.

The coupler 18 is fixed to the first coupling member 12A by screwing an attachment screw (not shown), which is inserted through a through hole that penetrates the coupler body 19 in the thickness direction, into the threaded hole of the attachment portion 51. As the coupler 18 is fixed to the attachment portion 51, the uncoupling output port 45 is connected to the uncoupling port 36 via a gasket (not shown) and the coupling output port 47 is connected to the coupling port 38 via a gasket. Each gasket may be an O-ring.

Figure 5:
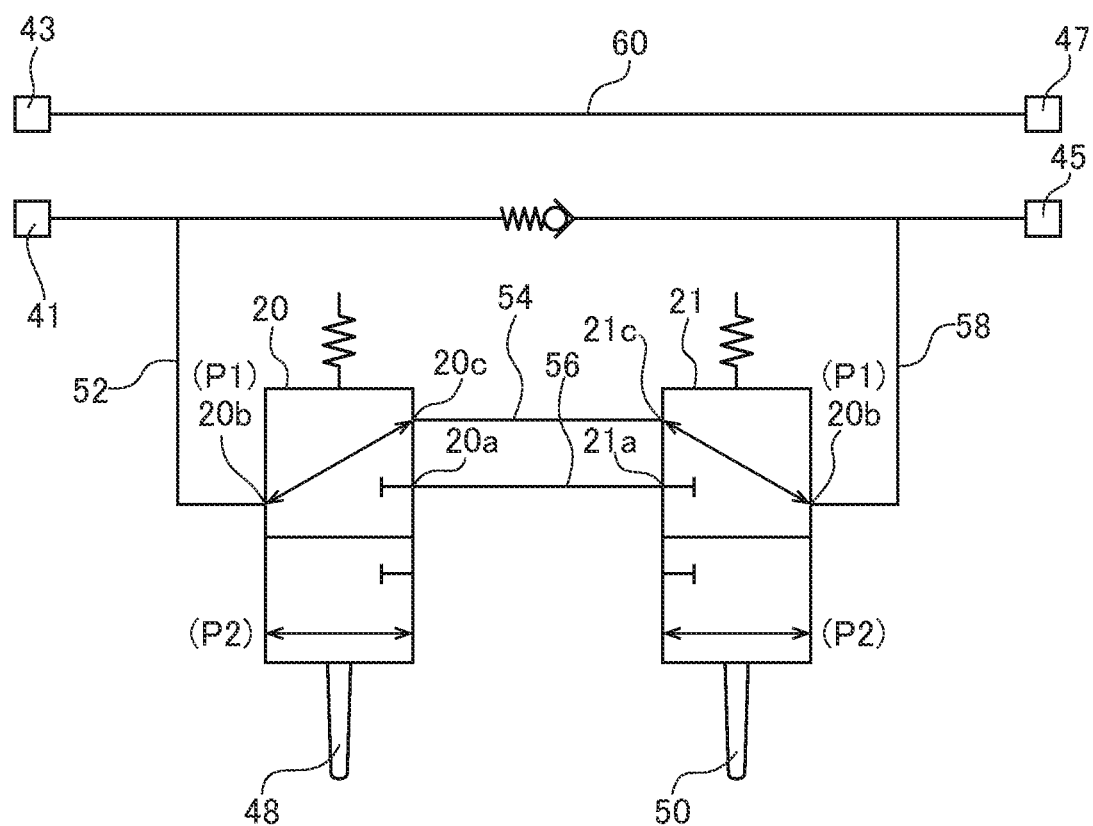
FIG. 5 is a pneumatic circuit diagram of the automatic tool exchange coupler according to the present embodiment.

Referring to FIG. 5, a pneumatic circuit formed inside the coupler 18 will be explained. The first direction switching valve 20 and the second direction switching valve 21 include first to third ports 20a to 20c and first to third ports 21a to 21c, respectively. The first direction switching valve 20 and the second direction switching valve 21 are each constantly held at a first position P1 using a spring. As pressed against the spring, the first valve 48 is switched from the first position P1 to a second position P2 by the first dog 22, whereas the second valve 50 is switched from the first position P1 to the second position P2 by the second dog 26.

The coupling input port 43 is connected to the coupling output port 47 through a coupling input path 60. The uncoupling input port 41 is connected to a second port 20b of the first direction switching valve 20 through an input path 52. The first ports 20a and 21a of the first direction switching valve 20 and the second direction switching valve 21 are connected to each other through an inner path, or first inner path 56, and the third ports 20c and 21c thereof are connected to each other through an inner path, or second inner path 54. The second port 21b of the second direction switching valve 21 is connected to the uncoupling output port 45 through an output path 58.

The first direction switching valve 20 has the second port 20b connected to the third port 20c at the first position P1. When switched to the second position P2, the first valve 48 has the second port 20b connected to the first port 20a. The second direction switching valve 21 has the third port 21c connected to the second port 21b at the first position P1. When switched to the second position P2, the second valve 50 has the first port 21a connected to the second port 21b.

2. Operation and Effects

Figure 6:
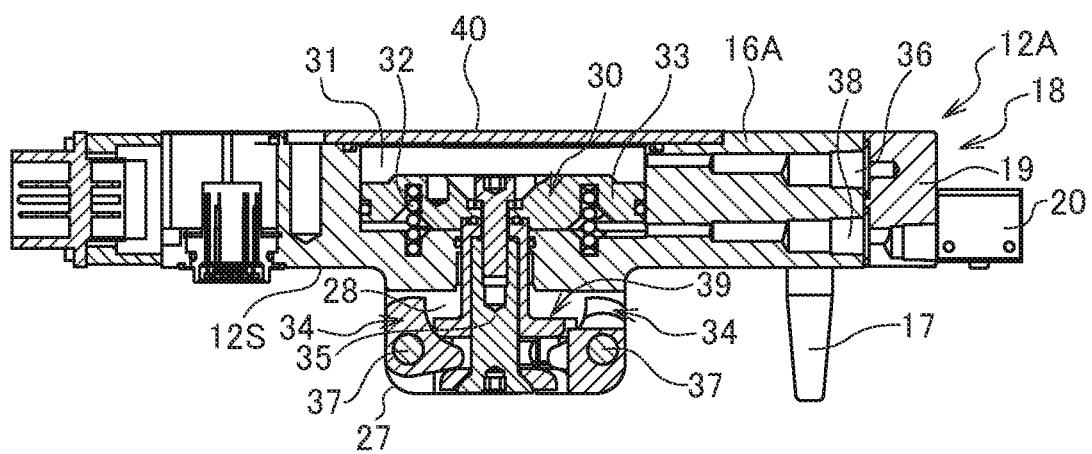
FIG. 6 is a cross sectional view taken along A-A in FIG. 1 showing an operation of the tool exchange device according to the present embodiment.

Next, an operation for coupling the first coupling member 12A and the second coupling member 14 will be explained. First, the first coupling member 12A and the second coupling member 14 are coaxially arranged for positioning. In this state, a fluid, or gas, is supplied through a supply/exhaust mechanism from the uncoupling port 36 to the one side of the cylinder chamber 31 across the piston 33. As the gas increases a pressure at the one side of the piston 33 beyond a force of the coil spring 32, the piston 33 is moved to the other side, that is, moved downward. This causes the operating unit 39 to press the receiving portion 49 of the cam 34 downward. The cam 34 then rotates around the support shaft 37 in an arrow direction, i.e., anticlockwise in FIG. 2. This causes the cam 34 to be housed in the protruding portion 27 (FIG. 6).

Figure 7:
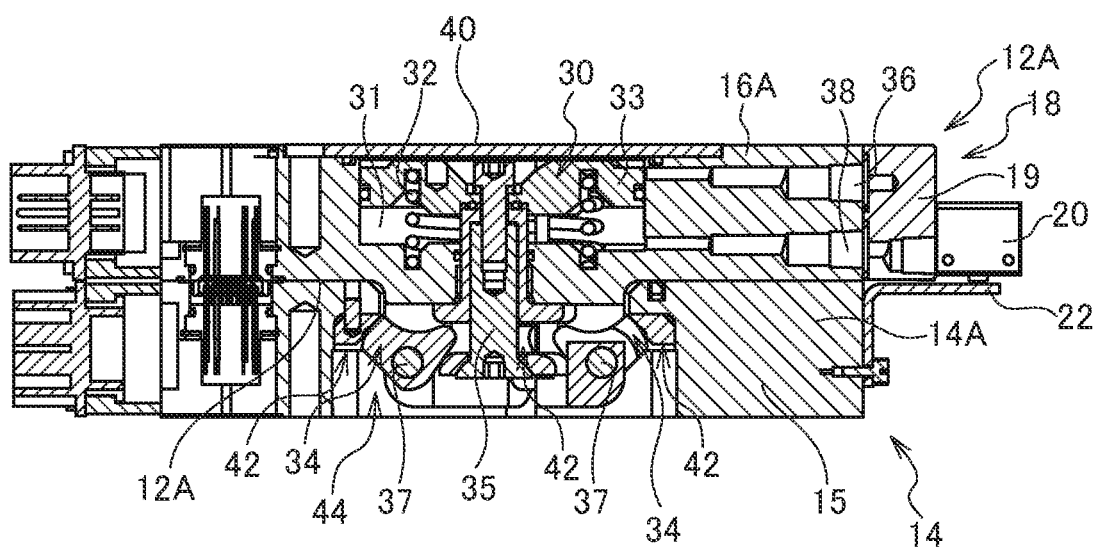
FIG. 7 is a cross sectional view showing a coupled state of the tool exchange device according to the present embodiment.

Subsequently, the protruding portion 27 of the first coupling member 12A is inserted into the coupling hole 44 of the second coupling member 14 until the first contact surface 12S comes into contact with a second contact surface 14S. In this state, the gas at the one side of the cylinder chamber 31 across the piston 33 is discharged from the uncoupling port 36 through the supply/exhaust mechanism. Simultaneously, a gas is supplied to the other side of the cylinder chamber 31 across the piston 33 from the coupling port 38. A pressure caused by the gas moves, or lifts, the piston 33 to the other surface side in conjunction with the force of the coil spring 32. This causes the operating unit 39 to push the receiving portion 49 of the cam 34 upward. The cam 34 then rotates around the support shaft 37 in an arrow direction, i.e., clockwise in the figure. This rotation causes the cam 34 to radially project from the protruding portion 27 with the operating portion 55 being engaged with an engagement surface of the engagement part 42. The first coupling member 12A and the second coupling member 14 are thus coupled (FIG. 7).

Furthermore, the gas is discharged from the coupling port 38 to the other side of the cylinder chamber 31 across the piston 33. Simultaneously, gas is supplied to the one side of the cylinder chamber 31 across the piston 33 from the uncoupling port 36, causing the cam 34 to rotate anticlockwise to be housed in the protruding portion 27. The uncoupling of the first coupling member 12A and the second coupling member 14 is thus achieved.

The automatic tool exchange device 10 according to the present embodiment, which includes the coupler 18, operates as follows when the first coupling member 12A and the second coupling member 14 are uncoupled, when the first coupling member 12A and the second coupling member 14 are coupled for work, or when the first coupling member 12A is inserted in the second coupling member 14 placed on the mount 24.

(Uncoupled State)

When the first coupling member 12A and the second coupling member 14 are uncoupled, that is, when the first valve 48 and the second valve 50 are each present at the first position P1, the uncoupling input port 41 is connected to the uncoupling output port 45 via the first direction switching valve 20 and the second direction switching valve 21. Thus, by operating the solenoid valve (not shown), the cylinder 30 can be moved in a coupling direction and an uncoupling direction.

(During Work with Robot)

During work with the first coupling member 12A and the second coupling member 14 being coupled, the second coupling member 14 is separated from the mount 24 with the first valve 48 being at the second position P2 and the second valve 50 being at the first position P1. At this time, the second direction switching valve 21 is closed and the uncoupling input port 41 is cut off from uncoupling output port 45. Thus, if an erroneous operation by an operator or electric noise causes a motion of the solenoid valve (not shown), the second coupling member 14 can be prevented from being unintentionally uncoupled from the first coupling member 12A.

(Operations for Uncoupling and Coupling of First Coupling Member 12A and Second Coupling Member 14 Placed on Mount 24)

When the first coupling member 12A is inserted in the second coupling member 14 placed on the mount 24 (FIG. 8), that is, when the first valve 48 and the second valve 50 are each present at the second position P2, the uncoupling input port 41 is connected to the uncoupling output port 45 via the first direction switching valve 20 and the second direction switching valve 21. Thus, by operating the solenoid valve (not shown), the cylinder 30 can be moved in the coupling direction and the uncoupling direction.

The coupler body 19 according to the present embodiment has the plurality of paths that communicate the plurality of ports and the uncoupling input port 41 is located at the position where the center thereof is radially offset with respect to the uncoupling output port 45 by at least the amount corresponding to the length of the diameter of the uncoupling input port, allowing a robot-side pipe to be directly connected to the uncoupling port 36 and the coupling port 38. The automatic tool exchange device 10 can thus eliminates the necessity of a pipe for connecting the coupler 18 to each of the uncoupling port 36 and the coupling port 38 with an improved user-friendliness. Since being located at the position where the center is radially offset, the uncoupling input port 41 is prevented from interfering with the uncoupling output port 45 for downsizing of the coupler body 19.

The coupler 18 has the uncoupling input port 41 and the coupling input port 43 located at the longitudinally left side thereof and the first direction switching valve 20 and the second direction switching valve 21 located at the longitudinally right side thereof, while the uncoupling input port 41 is located at the position offset leftward with respect to the uncoupling output port 45. This allows for downsizing of the coupler 18 as a whole. Thus, the coupler 18 is suitable for the compact automatic tool exchange device 10, that is, the first coupling member 12A that includes the cylinder 30 with a reduced axial length.

3. Modification(s)

The present invention is not limited to the above embodiment but may be modified as needed without departing from the spirit of the present invention.

Figure 9:
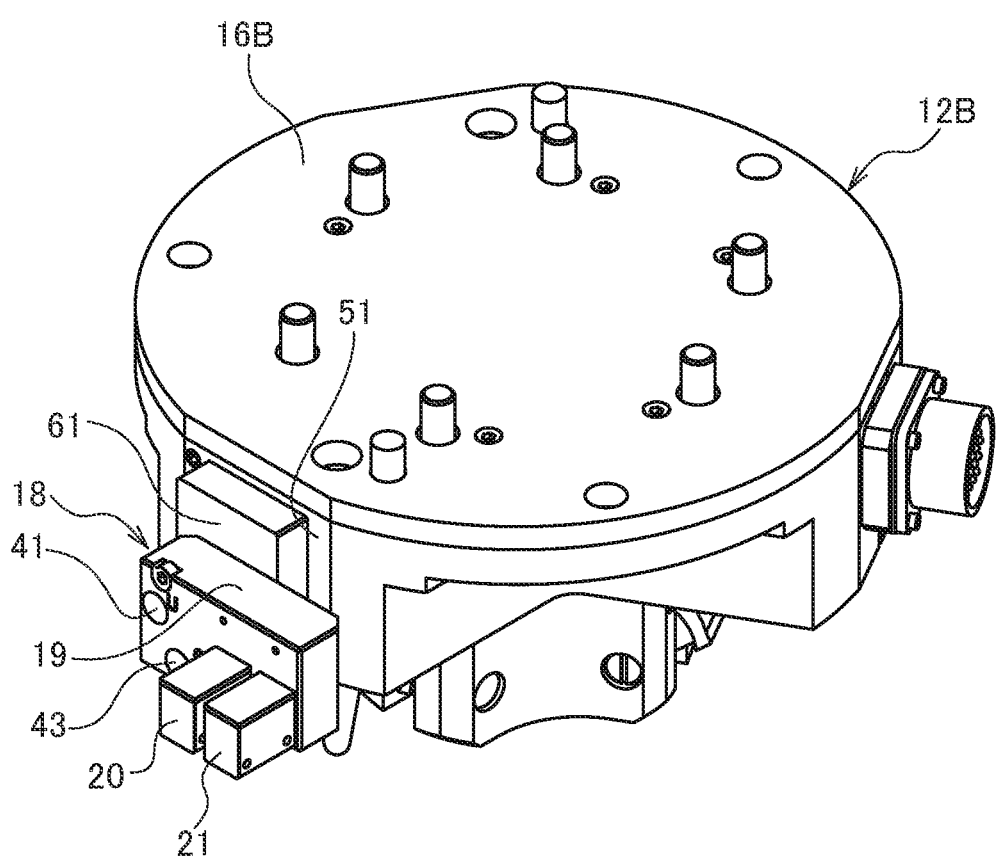
FIG. 9 is a perspective view showing a tool exchange device according to a modification of the present embodiment.

The above embodiment is explained with reference to the instance where the present invention is applied to the first coupling member 12A that includes the cylinder 30 with a reduced axial length, but the present invention is not limited thereto. For instance, as shown in FIG. 9, the coupler 18 may be applied to the first coupling member 12B with a larger size. Such a coupler 18 includes a second coupler body 61 located at the second side surface of the coupler body 19, that is, a surface facing the attachment portion 51.

Figure 10:
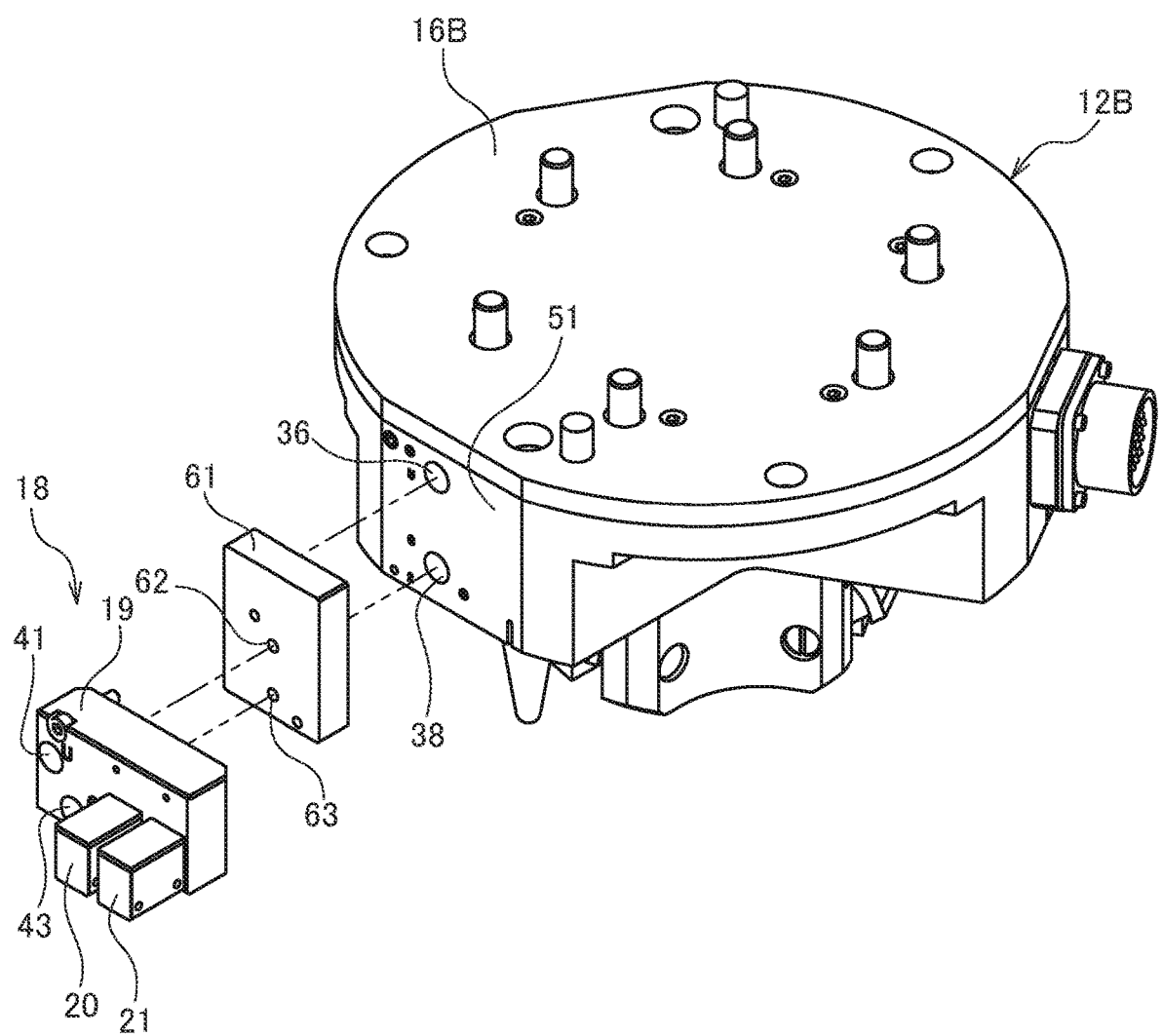
FIG. 10 is an exploded perspective view showing an automatic tool exchange coupler according to the modification of the present embodiment.

As shown in FIG. 10, a first coupling body 16B has the uncoupling port 36 and the coupling port 38 spaced at a distance larger than a distance between the uncoupling output port 45 and the coupling output port 47 formed in the second side surface of the coupler body 19. The second coupler body 61, which is a plate-shaped member of a vertically elongated rectangle, has a first side surface provided with a second uncoupling input port 62 and a second coupling input port 63 and the second side surface (not shown) provided with a second uncoupling output port and a second coupling output port. The second uncoupling input port 62 and the second coupling input port 63 are formed at positions corresponding to the uncoupling output port 45 (FIG. 4) and the coupling output port 47 (FIG. 4) formed in the second side surface of the coupler body 19, respectively. The second uncoupling output port and the second coupling output port are formed at positions corresponding to the uncoupling port 36 and the coupling port 38 formed in the attachment portion 51, respectively. The second coupler body 61 also has therein an uncoupling path that connects the second uncoupling input port 62 with the second uncoupling output port and a coupling path that connects the second coupling input port 63 with the second coupling output port, which are not shown.

As the coupler 18 is fixed to the attachment portion 51 with the second coupler body 61 sandwiched therebetween, the uncoupling output port 45 is connected to the uncoupling port 36 via the second uncoupling input port 62 and the second uncoupling output port. Likewise, the coupling output port 47 is connected to the coupling port 38 via the second coupling input port 63 and the second coupling output port.

The use of the second coupler body 61 according to the above modification allows the coupler body 19 to be applied to the first coupling member 12B with a larger size. Thus, the parts of the coupler 18 can be used in common with an improved versatility.

The above embodiment is explained with reference to the instance where the present invention is applied to the automatic tool exchange device 10 configured to have the cross-sectional structure shown in FIG. 2, but the present invention is not limited thereto. The present invention may be applied to an automatic tool exchange device with any configuration as long as the uncoupling port 36 and the coupling port 38, through which a compressed gas for uncoupling or coupling the first coupling member 12A and the second coupling member 14 is introduced, are located in parallel with each other in the axial direction.

The above embodiment is explained with reference to the instance where the uncoupling input port 41 is located at the position offset leftward with respect to the uncoupling output port 45, but the present invention is not limited thereto and the uncoupling input port 41 may be located at a position offset rightward. Alternatively, the uncoupling input port 41 may be located at a position offset upward or downward with respect to the uncoupling output port 45. When the uncoupling input port 41 is located at the position offset upward or downward with respect to the uncoupling output port 45, the interference between the input path 52 and the output path 58 can be prevented, thus allowing for further reducing a thickness of the coupler body. Alternatively, the uncoupling input port 41 may be located at a predetermined vertical position offset leftward with respect to the uncoupling output port 45 by at least an amount corresponding to the length of the diameter of the uncoupling input port, that is, a predetermined diagonally upper left position or predetermined position diagonally lower left position with respect to the uncoupling output port 45. The predetermined upper or lower position is a position where the interference between the input path 52 and the output path 58 can be prevented. When the uncoupling input port 41 is located at the predetermined obliquely upper or lower left position with respect to the uncoupling output port 45, a vertical length, horizontal length, and thickness of the coupler body can be optimized for further downsizing of the coupler.

REFERENCE SIGNS LIST

10 automatic tool exchange device
12A, 12B first coupling member
14 second coupling member
18 coupler
19 coupler body
20 first direction switching valve
21 second direction switching valve
22 first dog (dog)
24 mount
31 cylinder chamber
34 cam
36 uncoupling port
38 coupling port
41 uncoupling input port
43 coupling input port
45 uncoupling output port
47 coupling output port
52 input path
54 second inner path (inner path)
56 first inner path (inner path)
58 output path
61 second coupler body
62 second uncoupling input port
63 second coupling input port

The invention claimed is:

1. An automatic tool exchange coupler used for an automatic tool exchange device, the automatic tool exchange device including a first coupling member being removably attached to a body of an apparatus and a second coupling member being removably attached to a tool, the first coupling member including a cylinder chamber and having a coupling port and an uncoupling port that are connected to the cylinder chamber and arranged in parallel with an axial direction of the cylinder chamber, the second coupling member being coupled to or uncoupled from the first coupling member by moving a cam provided to the first coupling member with a gas supplied to the coupling port or the uncoupling port, the coupler comprising:

a coupler body; and
a first direction switching valve and a second direction switching valve that are provided to a first side surface of the coupler body, the first direction switching valve switchable depending on whether the first coupling member is coupled to the second coupling member, the second direction switching valve switchable depending on whether the first coupling member is coupled to the second coupling member placed on a mount, wherein the coupler body comprises:

a plurality of ports and a plurality of paths that communicating the plurality of ports;

in the first side surface, a coupling input port being connected to a pipe for introducing a gas for coupling and an uncoupling input port being connected to a pipe for introducing a gas for uncoupling; and in a second side surface opposite to the first side surface, a coupling output port being configured to connected to the coupling port and an uncoupling output port being configured to connected to the uncoupling port; and the coupling input port and the coupling output port are coaxially arranged, the uncoupling output port is arranged in parallel with the coupling output port in the axial direction of the cylinder chamber, and the uncoupling input port is located at a position where a center of the uncoupling input port is radially offset with respect to the uncoupling output port by at least an amount corresponding to a length of a diameter of the uncoupling input port.

2. The automatic tool exchange coupler according to claim 1, wherein the coupler body comprises:

an input path that connecting the uncoupling input port with the first direction switching valve;

an inner path that connecting the first direction switching valve with the second direction switching valve; and an output path that connecting the second direction switching valve with the uncoupling output port.

3. The automatic tool exchange coupler according to claim 1, further comprising a second coupler body located on the second side surface of the coupler body, the second coupler body comprising:

in a first side surface, a second coupling input port being connected to the coupling output port, and a second uncoupling input port being connected to the uncoupling output port; and in the second side surface opposite to the first side surface, a second coupling output port being connected to the coupling port, a second uncoupling output port being connected to the uncoupling port, a coupling path connecting the second coupling input port with the second coupling output port, and an uncoupling path connecting the second uncoupling input port with the second uncoupling output port.

4. An automatic tool exchange device comprising:

the first coupling member provided with the automatic tool exchange coupler according to claim 1; and the second coupling member provided with a dog, the dog being at a position corresponding to the first direction switching valve.

* * * * *